United States Patent [19]

Takeuchi

[11] Patent Number: 5,055,701

[45] Date of Patent: Oct. 8, 1991

[54] OPERATOR RESPONSIVE KEYLESS ENTRY SYSTEM WITH VARIABLE RANDOM CODES

[75] Inventor: Mikio Takeuchi, Kanagawa, Japan

[73] Assignee: Nissan Motor Company, Limited, Japan

[21] Appl. No.: 394,086

[22] Filed: Aug. 15, 1989

[30] Foreign Application Priority Data

Aug. 16, 1988 [JP] Japan ................................ 63-202687

[51] Int. Cl.[5] ........................ B60R 25/00; G08C 19/00

[52] U.S. Cl. .................................. 307/10.2; 361/172; 340/825.69; 180/287

[58] Field of Search ............... 361/171, 172; 307/10.2, 307/10.5; 340/825.31, 825.25, 825.69, 825.32, 825.34; 180/287

[56] References Cited

U.S. PATENT DOCUMENTS 4,758,835 7/1988 Rathmann et al. ............. 340/825.31

4,794,268 12/1988 Nakano et al. ................. 340/825.31

4,881,148 11/1989 Lambropoulos et al. ......... 307/10.2

4,928,098 5/1990 Dannhaeuser ...................... 361/171

*Primary Examiner*—A. D. Pellinen

*Assistant Examiner*—Richard T. Elms

*Attorney, Agent, or Firm*—Lowe, Price, LeBlanc & Becker

[57] ABSTRACT

A keyless entry system for providing controlled access is provided. This system includes a portable transmitter carried by an authorized person and a control system for controlling a locking mechanism. When locking or unlocking, the portable transmitter outputs an input signal to the control system. Upon receiving the input signal, the control system generates a request code signal for output to the portable transmitter. The request code signal generally includes a sequence of random code and an identification code. The control system further generates a particular code signal into which the random code is converted according to information indicated by a specific code stored in the control system. Simultaneously, in the portable transmitter, the random code is converted in the same manner by a user particular code signal equal to the particular code and is transmitted to the control system. The control system compares the particucar code signal with the user particular code signal to activate the locking mechanism to lock or unlock a door when the two particular code signals are coincident with each other.

15 Claims, 3 Drawing Sheets

OPERATOR RESPONSIVE KEYLESS ENTRY SYSTEM WITH VARIABLE RANDOM CODES

BACKGROUND OF THE INVENTION

1. Technical Field

The present invention relates generally to controlled access and more particularly to a keyless entry system which is especially adaptable for application in vehicles.

2. Background Art

A keyless entry system wherein a card type portable transmitter (substantially the same size as a credit card, with a thickness of about 3 mm) is carried by the user is well known in the art. The user pushes a request switch button installed on a driver's door to communicate between the portable transmitter and a door lock system to lock or release a door lock without a mechanical key. This keyless entry system can save a user taking out a mechanical key to lock or unlock a door at every access, to an automotive vehicle for example.

A U.S. Pat. No. 4,794,268, entitled "AUTOMOTIVE KEYLESS ENTRY SYSTEM INCORPORATING PORTABLE RADIO SELF-IDENTIFYING CODE SIGNAL TRANSMITTER" by Kinichiro Nakano et. al., assigned to NISSAN MOTOR CO., LTD, discloses a keyless entry system using a card type transmitter. Such a keyless entry system, as applied to a vehicle, includes a door lock control system disposed within the vehicle. Depression of a request switch button disposed on a door handle for example causes a request code signal provided in the door lock control system to be transmitted from an antenna as a starting signal to a portable transmitter. In the portable transmitter, the received request code signal is collated with an identifying code signal stored in a memory of the transmitter. If coincidence between the code signals is indicated, the portable transmitter outputs an owner permanent code signal to the vehicle. The door lock control system receives the owner permanent code signal to compare it with the vehicle permanent code signal, operating an actuator for locking or unlocking the driver's door when both permanent code signals are coincident with each other.

However, the conventional keyless entry system uses a fixed code signal to communicate between vehicle and transmitter. Thus, if communication signals were received by an unauthorized person using a high sensitivity receiver for example and a transmitter capable of transmitting the same signal is used, the door lock may be easily released by an unauthorized person without need of the regular portable transmitter.

SUMMARY OF THE INVENTION

It is accordingly an object of the present invention to provide an improved controlled access system which does not require a mechanical key to provide improved security characteristics for a locked enclosure, for example, an automotive vehicle.

According to one aspect of the present invention, there is provided a keyless entry system which comprises a first means for providing a random code variable at every operation, a second means for providing a request code signal including the random code, a third means for providing a first particular code signal based on the random code and a first predetermined code stored in a memory, a fourth means for outputting the request code signal, a fifth means for receiving the request code signal to provide a second particular code signal based on the random code included in the received request code signal and a second predetermined code stored in memory, which is identical with the first predetermined code, a comparing means for comparing the first particular code signal with the second particular code signal to provide a signal indicative thereof, and a control means for controlling access in response to the signal from the comparing means when the first particular code signal is matched with the second particular code signal.

According to another aspect of the invention, there is provided a keyless entry system for a vehicle which comprises a door lock means for locking or unlocking a door of a vehicle, a first means for providing a random code variable at every operation, a second means for providing a request code signal including the random code, a third means for providing a first particular code signal into which the random code is converted based on a first predetermined code stored in a memory, a fourth means for outputting the request code signal, a fifth means for receiving the request code signal and including a sixth means for providing a second particular code signal into which the random code included in the received request code signal is converted based on a second predetermined code stored in memory, which is identical with the first predetermined code, a seventh means for outputting the second particular code signal, a comparing means for comparing the first particular code signal with the second particular code signal input from the seventh means to provide a signal indicative thereof, and a control means for controlling the door lock means in response to the signal from the comparing means when the first particular code signal is matched with the second particular code signal.

In the preferred mode, the request code further includes a first specific code, the fifth means having a second specific code and comparing the second specific code with the first specific code included in the input request code signal to provide the second particular code signal when the first specific code is matched with the second specific code. The fifth means may be a portable transmitter carried by an authorized person. The random code, the first particular code, the second particular code, the first predetermined code, the second particular code, and the second predetermined code may be sequence of bit codes. The first predetermined code indicates a predetermined operation, the first particular code signal is provided by operating the random code according to the predetermined operation of the first predetermined code. The random code includes a plurality of blocks each having a sequence of bit, the first and the second predetermined codes having a plurality of blocks each respectively indicating a predetermined operation, the first particular code and the second particular code including a plurality of blocks each respectively including a sequence of bit code into which a plurality of blocks of the random code are operated by the predetermined operation indicated by one block of each of the first and the second predetermined code.

DESCRIPTION OF THE PREFERRED EMBODIMENT

Figure 1:
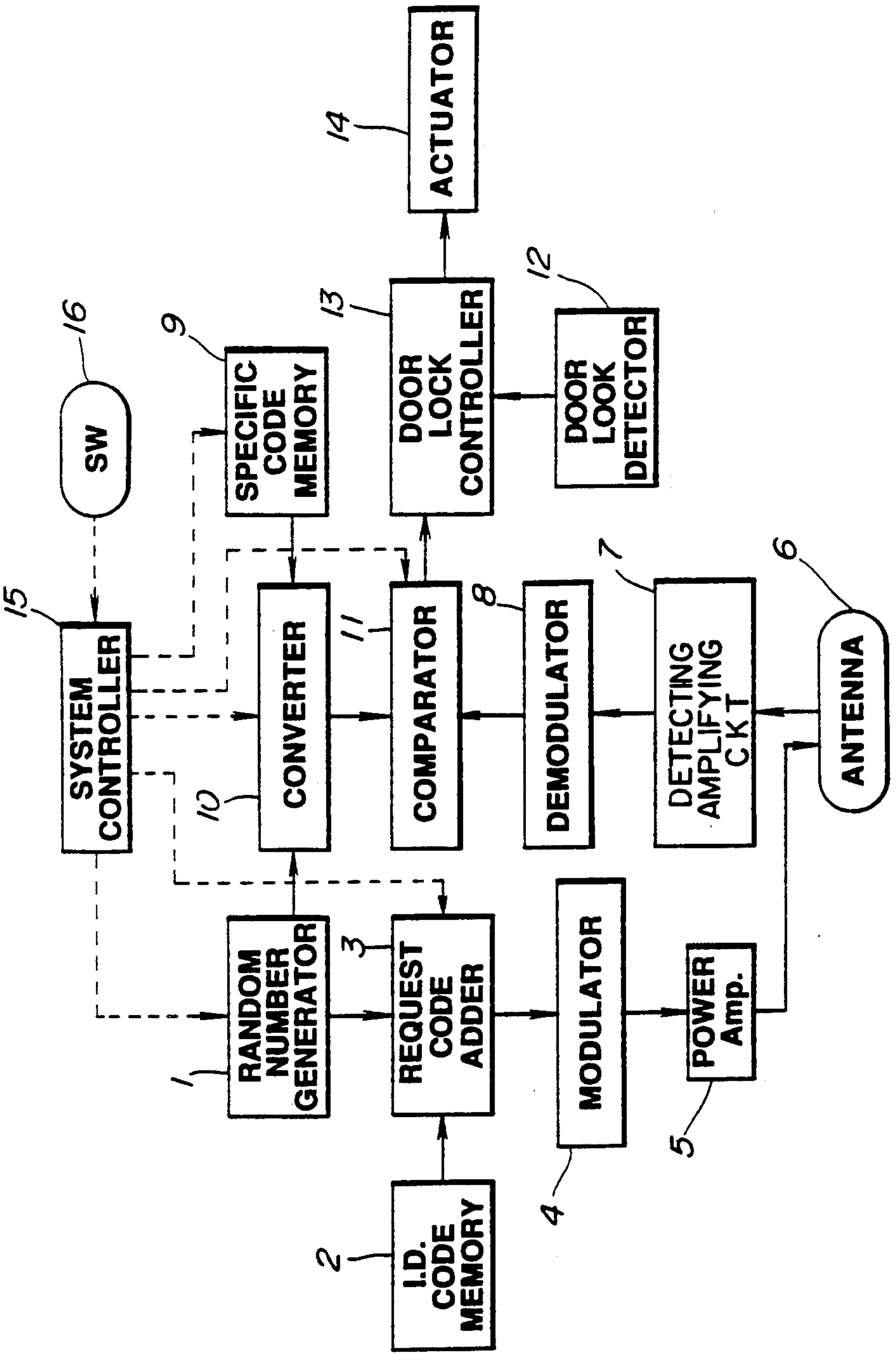
FIG. 1 is a block diagram which shows the locking-/unlocking system incorporated in a keyless entry system according to the present invention.

Referring now to the drawings, particularly to FIG. 1, a block diagram of a locking/unlocking system of a keyless entry system according to the present invention is shown. This locking/unlocking system may be incorporated, although not exclusively, in automotive vehicles and applied as an automotive door locking and unlocking system. As an example of another application, a keyless entry system disposed in a door of a house is also provided.

Figure 2:
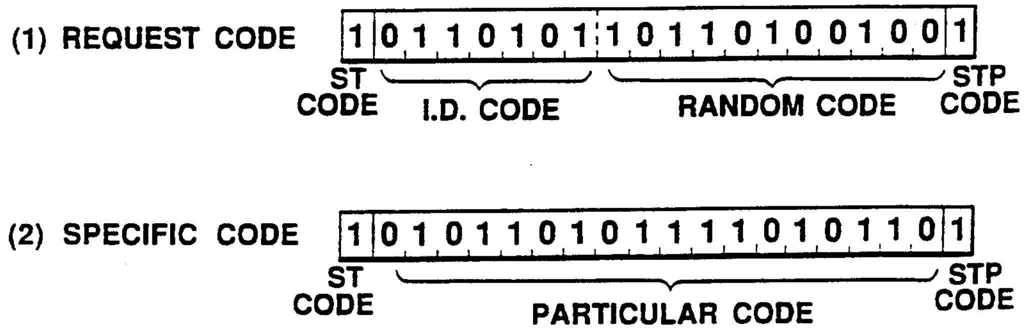
FIG. 2 is a view which shows the sequence of a request code transmitted from a locking/unlocking system and the sequence of a specific code provided with a random code and an identification code.

The locking/unlocking system includes a transmitting circuit which comprises generally a random number generator 1, an identification code memory 2, a request code adder 3, a modulator 4, a power amplifier 5, and an antenna 6 for transmission/reception. The random number generator 1 is adapted for providing a sequence of random signals indicating random numbers, especially M series signals which vary at every operation. The identification code memory 2 provides a sequence of identification code signals for identifying a portable transmitter carried by an authorized person, or user. The request code adder is for mixing the sequence of random signals and the sequence of identification code signals to provide a request code signal. This request code is provided with a series of bit codes as shown in FIG. 2, (1) for example. The series of bit codes includes a start bit code indicative of starting the request code, and a stop code indicative of the end of the request code. The modulator 4 modulates the request code input from the request code adder via frequency modulation (FM) or amplitude modulation (AM). The power amplifier 5 amplifies the modulated code to supply it to the antenna 6 for transmission.

The locking/unlocking system further includes a detecting/amplifying circuit 7, a demodulator 8, a specific code memory 9, a code converter 10, a comparator 11, a door lock detector 12, a door lock controller 13, and an actuator 14. The detecting/amplifying circuit 7 is comprised of a detector for detecting a signal transmitted from the portable transmitter of the user via the antenna 6 and an amplifier for amplifying the detected signal to supply it to the demodulator 8. The demodulator 8 demodulates the amplified signal for output to the comparator 11. The specific code memory 9 has a predetermined permanent specific code. The code converter 10 converts the random code signal input from the random number generator 1 according to the indication of the specific code to supply the converted signal to the comparator 11. The comparator 11 compares the converted random code signal with the demodulated code signal from the demodulator 8 to provide a signal to the door lock controller 13. The door lock detector is adapted for detecting the locked or unlocked state of a door locking mechanism (not shown) disposed for example, in the driver's door of a vehicle to provide a signal indicative thereof to the door lock controller. The door lock controller 13 provides a drive signal to the actuator in response to the signal output from the comparator 11 to activate the door locking mechanism of the vehicle. The comparator 11, the door lock detector 12, the actuator 14, and the door lock controller 13 cooperatively provide the locking/unlocking means. It will be noted that, upon reception of the drive signal if the door is detected to be in an unlocked state, the actuator is activated to lock the door, while the detection of a locked state of the door causes the actuator to operate to release the door. The locking/unlocking system still further includes a system controller 15 and a request switch 16. The system controller 15 is operable to control the operation timing of the system and is connected to the associated elements via control signal lines indicated by dotted lines in the drawing. The controller 15 comprises a microcomputer for example. Input of the request switch 16 causes system operation to start.

Figure 3:
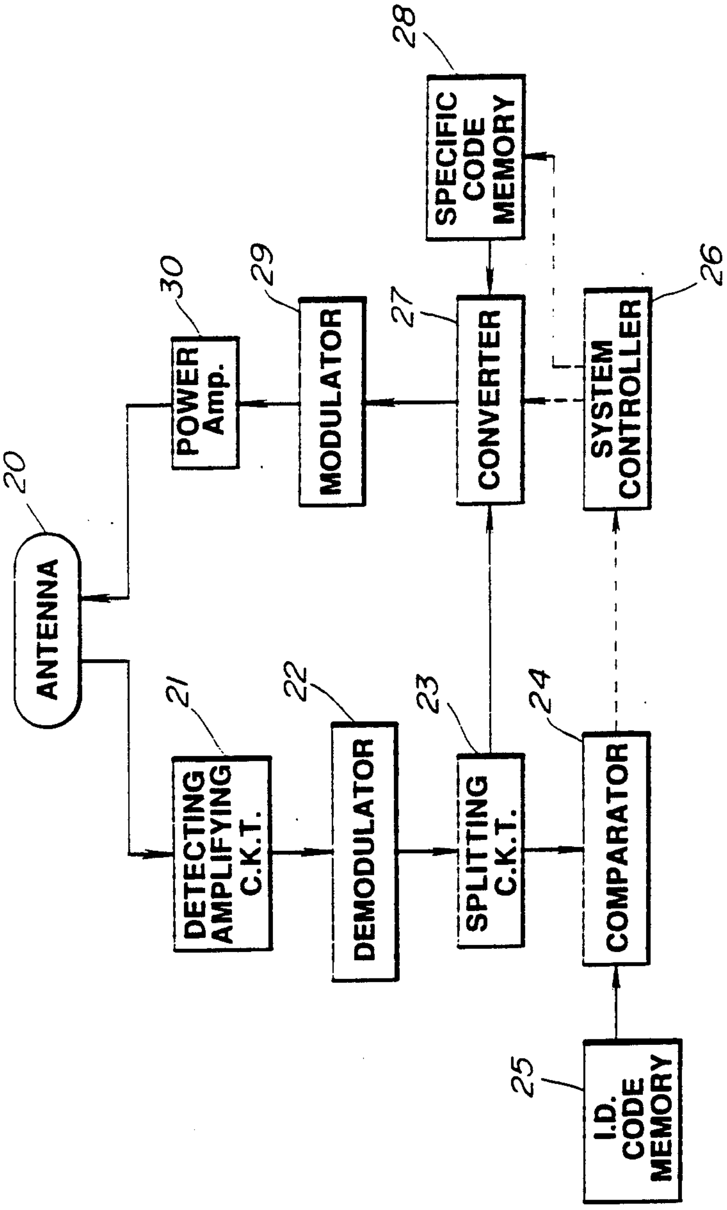
FIG. 3 is a block diagram which shows a system which can be incorporated in a portable transmitter carried by an authorized person, or user.

Referring to FIG. 3, the system incorporated in the portable transmitter is shown, which is, as described above, carried by the user, or owner when he leaves the automotive vehicle. This system includes an antenna 20 with which to receive a request code signal transmitted from the above mentioned locking/unlocking system provided in the vehicle. The received request signal is then supplied to a detecting/amplifying circuit 21. The detecting/amplifying circuit 21 detects the request code signal and amplifies the detected signal to supply it to a demodulator 22. A splitting circuit 23 is adapted for splitting the request code signal as shown in FIG. 2, (1) into the identification code signal and the random code signal. A digital comparator 24 collates the split identification code signal with an owner identification code signal stored in an identification code memory 25 to provide a signal to a system controller 26 when those two codes are matched to each other. Further, the matching causes a code converter 27 to be operated. The code converter 27 converts the random code signal included in the request code signal into a particular code signal in cooperation with a specific code signal, similar to the specific code signal of the locking/unlocking system, stored in a specific code memory 28. This code converter functions similarly to the above described code converter 10 incorporated in the locking-/unlocking system. The particular code signal provided in the code converter is modulated by a modulator 29 and then is amplified by a power amplifier 30 to be transmitted via the antenna 20 to the locking/unlocking system disposed within the vehicle. The modulator 29 and the power amplifier 30 provide a transmission circuit.

Figure 4:
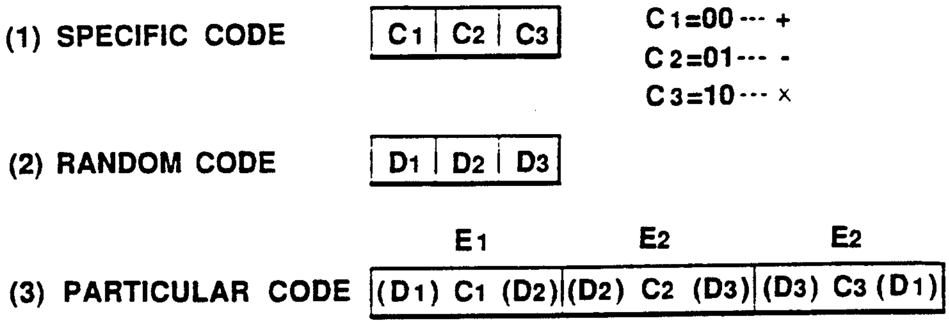
FIG. 4 is a view which shows the combination of a particular code provided from a random code and an identification code.

Referring again to FIG. 2, an example of a sequence of particular code comprising the particular code signal is shown. This particular code signal is, as described above, provided by the conversion of the random code signal using the identification code signal. For example, this conversion is such that the product of the random code and the identification code or the logical product thereof provides the particular code signal. Alternatively, as shown in FIG. 4, the identification code is provided with operation codes $C_1$, $C_2$, and $C_3$ each indicating a predetermined operation. The random code signal is divided into three blocks $D_1$, $D_2$, and $D_3$. The identification code signal is also divided into three blocks $E_1$, $E_2$, and $E_3$. Each block of the identification code signal includes the operation results of two predetermined blocks in the random code signal. For example, if the operation code $C_1=00$ designates the operation sum, the $E_1$ block of the particular code signal as shown in FIG. 4 is provided with the sum of the blocks $D_1$ and $D_2$. Unlimited variations of the particular code signal can be obtained. It will be appreciated that the complicated process of conversion improves the security of the keyless entry system according to the invention.

In operation, the turning on of the request switch 16 by the authorized user causes the system controller 15 to activate the associated circuits, transmitting the request code signal provided by adding the identification code to the random code. Reception of the request code signal by the portable transmitter causes the request code signal to be compared with the owner identification code signal in the comparator 24 to determine as to whether the input identification signal matches the owner identification code signal or not. When the determination indicates coincidence of the identification code with the owner identification code, the code converter 27 converts the random code included in the request code signal using the identification code and then the converted code is output as the owner particular code signal from the antenna 20.

Simultaneously, in the locking/unlocking system within the vehicle, the code converter 10 converts the random code signal using the identification code signal to provide the particular code signal to the comparator 11. The comparator 11 compares the particular code signal with the owner particular code signal and provides a signal to the door lock controller 13 as a result of coincidence of the particular code signal and the owner particular code signal. The door lock controller determines the locking state of the locking mechanism of the vehicle based on the output signal from the door lock detector 12 to operate the actuator 14, accordingly locking or unlocking the locking mechanism.

As mentioned above, in a keyless entry system according to the present invention, a locking/unlocking system disposed within a vehicle provides a request code signal which includes a sequence of random codes and a sequence of identification codes in response to a signal transmitted from a portable transmitter. The request code signal is transmitted to the portable transmitter. In the portable transmitter, the random code included in the request code signal is converted into a particular code signal using a specific code. Similarly, the portable transmitter provides an owner particular code signal into which the random code is converted using a specific code, stored in the transmitter, similar to the specific code of the locking/unlocking system. The particular code signal and the owner particular code signal are compared to determine identification therebetween. The particular code signal is varied dependent upon the sequence of random codes which are changed every operation. Thus, if an unauthorized person knows the specific code and makes a transmitter for transmitting a signal comprising the specific code the security of the system will still not be breached as the particular code is changed at every operation, this is to determine whether an input signal from a portable transmitter is transmitted by an authorized person or not. It will thus be noted that the security characteristics of the keyless entry system of the invention are greatly improved over the prior art.

What is claimed is:

1. A keyless entry system comprising:

first means responsive to a system operation starting signal provided by an operator for providing a random code variable at every operation;

second means for providing a request code signal including said random code;

third means for providing a first particular code signal based on said random code and a first predetermined code stored in a memory;

fourth means for outputting said request code signal;

fifth means for receiving said request code signal to provide a second particular code signal based on said random code included in the received request code signal and a second predetermined code stored in a memory which is identical with said first predetermined code;

comparing means for comparing said first particular code signal with said second particular code signal to provide a signal indicative thereof; and control means for controlling access in response to the signal from said comparing means when said first particular code signal is matched with said second particular code signal.

2. A keyless entry system as set forth in claim 1, wherein said request code further includes a first specific code, said fifth means having a second specific code and means for comparing said second specific code with said first specific code included in the input request code signal to provide said second particular code signal when said first specific code is matched with said second specific code.

3. A keyless entry system as set forth in claim 1, wherein said fifth means is a portable transmitter carried by the operator.

4. A keyless entry system as set forth in claim 1, wherein said random code, said first particular code, said first predetermined code, said second particular code, and said second predetermined code are sequences of bit codes.

5. A keyless entry system as set forth in claim 1, wherein said first predetermined code indicates a predetermined operation, said first particular code signal is provided by manipulating said random code according to the predetermined operation of said first predetermined code.

6. A keyless entry system as set forth in claim 4, wherein said random code includes a plurality of blocks each comprising sequence of bits, said first and said second predetermined codes having a plurality of blocks, each block respectively indicating a predetermined operation, said first particular code and said second particular code including a plurality of blocks, each block respectively including a sequence of bit code with which a plurality of blocks of said random code are manipulated according to the predetermined operation indicated by one block of each of said first and said second predetermined codes.

7. A keyless entry system for a vehicle comprising:

door lock means for locking or unlocking a door of a vehicle;

first means responsive to a system operation starting signal provided by an operator for providing a random code variable at every operation;

second means for providing a request code signal including said random code;

third means for providing a first particular code signal into which said random code is converted based on a first predetermined code stored in a memory;

fourth means for outputting said request code signal;

fifth means for receiving said request code signal, said fifth means including;

sixth means for providing a second particular code signal into which said random code, included in the received request code signal, is converted, based on a second predetermined code, identical with said first predetermined code, which is stored in a memory, and seventh means for outputting said second particular code signal;

comparing means for comprising said first particular code signal with said second particular code signal input from said seventh means to provide a signal indicative thereof; and control means for controlling said door lock means in response to the signal from said comparing means when said first particular code signal is matched with said second particular code signal.

8. A keyless entry system for a vehicle as set forth in claim 7, wherein said request code further includes a first specific code, said fifth means having a second specific code and means for comparing said second specific code with said first specific code included in the input request code signal to provide said second particular code signal when said first specific code is matched with said second specific code.

9. A keyless, entry system for a vehicle as set forth in claim 7, wherein said fifth means is a portable transmitter.

10. A keyless entry system for a vehicle as set forth in claim 7, wherein said first predetermined code indicates a predetermined operation, said first particular code signal is provided by operating said random code according to said predetermined operation of said first predetermined code.

11. A keyless entry system as set forth in claim 7, wherein said random code includes a plurality of blocks each having a sequence of bits, said first and said second predetermined codes having a plurality of blocks, each block respectively indicating a predetermined operation, said first particular code and said second particular code including a plurality of blocks, each block respectively including a sequence of bit code with which a plurality of blocks of said random code are manipulated according to the predetermined operation indicated by one block of each of said first and said second predetermined codes.

12. A keyless entry system for controlling access to a vehicle comprising:

transmitting means for transmitting a first particular code signal; and receiving means for receiving the first particular code signal from said transmitting means:

said receiving means including, first means responsive to a system operation starting signal provided by an operator for generating a random code variable at every system operation, second means for providing a request code signal including the random code provided by said first means and a first preselected identification code stored in a memory to output request code signal to said transmitting means, and third means for providing a second particular code signal including a code obtained by modifying the random code according to preselected algorithm stored in a memory, said transmitting means including;

fourth means for receiving the request code signal output from said second means, said fourth means responsive to concurrence of the first preselected identification code included in the received request code with a second preselected identification code stored in a memory to provide the first particular code signal including a code obtained by modifying the random code included in the request code signal according to a preselected algorithm stored in a memory which is identical with the preselected algorithm of said third means to output the first particular code signal to said receiving means, said receiving means further including, comparing means for comparing the second particular code signal with the first particular code signal output from said transmitting means to provide a signal indicative thereof, and control means responsive to the signal output from said comparing means when the first and second particular code signals agree with each other for controlling access to the vehicle.

13. A system as set forth in claim 12, wherein said transmitting means is a portable transmitter.

14. A system as set forth in claim 12, wherein said first and second particular code signals include codes which are derived by multiplying the random code by the first and second preselected identification codes respectively.

15. A system as set forth in claim 12, wherein the random code includes a plurality of blocks each comprising a sequence of bits, said first and second preselected identification codes having a plurality of blocks, each block respectively indicating a predetermined mathematical operation, said first particular code and the second particular code including a plurality of blocks, each block respectively including a sequence of bits with which a plurality of blocks of said random code are manipulated according to the predetermined mathematical operation indicated by one block of each of said first and second preselected identification codes.

* * * * *